United States Patent [19]
Hou

[11] Patent Number: 5,408,425
[45] Date of Patent: Apr. 18, 1995

[54] SPLIT-RADIX DISCRETE COSINE TRANSFORM

[75] Inventor: Hsieh S. Hou, Rancho Palos Verdes, Calif.

[73] Assignee: The Aerospace Corporation, El Segundo, Calif.

[21] Appl. No.: 67,503

[22] Filed: May 25, 1993

[51] Int. Cl.⁶ ............................................. G06F 7/38
[52] U.S. Cl. .................................................... 364/725
[58] Field of Search ............... 364/725, 726, 727, 754, 364/757; 382/41

[56] References Cited

U.S. PATENT DOCUMENTS

| | | | |
|---|---|---|---|
| 4,797,847 | 1/1989 | Duhamel | 364/725 |
| 4,831,574 | 5/1989 | Duhamel | 364/725 |

OTHER PUBLICATIONS

Hou "A fast recursive algorithm for computing the discrete cosine transform" (IEEE Transactions on Acoustics . . . , vol. ASSP-35, No. 10, Oct. 1987).

*Primary Examiner*—Paul P. Gordon
*Assistant Examiner*—Emmanuel Moise
*Attorney, Agent, or Firm*—William J. Burke; Derrick M. Reid

[57] ABSTRACT

A special purpose processor and method of computation for performing an N-length real-number discrete cosine transform (DCT). The algorithm is called the split-radix discrete cosine transform because an Nth order DCT consists of an (N/2)th order DCT and two (N/4)th order inverse DCT (IDCT), where N is an integer power of 2 and larger than 4. In the embodiments of the invention, signal flow-graphs for both the forward and inverse scaled DCT have been implemented based on fused multiply and add operations in pipeline architectures. In the two-dimensional cases, over 20% arithmetic operations are saved compared to other known fast two-dimensional DCT algorithms. In addition, the split-radix DCT method offers flexibility of processing different input sizes under software control.

14 Claims, 10 Drawing Sheets

SPLIT-RADIX DISCRETE COSINE TRANSFORM

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

The discrete cosine transform (DCT), a special kind of orthonormal transform, has been widely accepted as the preferred method for compressing and decompressing gray-scaled images. A DCT compressor comprises mainly two parts: The first part transforms highly correlated image data into weakly correlated coefficients using a DCT transform and the second part performs adaptive quantization on coefficients to reduce the bit rate for transmission or storage. However, the computational burden in performing a DCT is demanding. For example, to process a one-dimensional DCT of length 8 pixels requires 11 multiplications and 29 additions in currently known fast algorithms. In practice, the image is divided into square blocks of size 8 by 8 pixels, 16 by 16 pixels or 32 by 32 pixels. Each block is often processed by the one-dimensional DCT in row-by-row fashion followed by column-by-column. On the other hand, different image block sizes are selected for compression due to different types of input images and different quality requirements on the decompressed image. A radix-2 DCT algorithm has been described in the article, "A Fast Recursive Algorithm for Computing the Discrete Cosine Transform," IEEE Trans. on Acoustics, Speech, and Signal Processing, Vol. ASSP-35, No. 10, pp. 1455-1461, by H. S. Hou in October 1987. The purpose is to reduce the number of multiplications as well as to offer design flexibility of processing different sizes of DCT blocks. The references in the above article list the prior arts of the DCT algorithms.

In the article, "A Fast DCT-SQ Scheme for Images," Trans. IEICE, Vol. E-71, No. 11, pp. 1095-1097, Nov. 1988, Y. Arai, T. Agui, and M. Nakajima have proposed that many of the DCT multiplications can be formulated as scaling multipliers to the DCT coefficients. The DCT after the multipliers are factored out is called the scaled DCT. Evidently, the scaled DCT is still orthogonal but no longer normalized, whereas the scaling factors may be restored in the following quantization process. Arai, et al. have demonstrated in their article that only 5 multiplications and 29 additions are required in processing an 8-point scaled DCT. Then E. Feig has mathematically described the scaled DCT, in particular the 8 by 8 scaled DCT, in U.S. Pat. No. 5,293,434 issued on Mar. 8, 1994 and the article, "A Fast Scaled-DCT Algorithm," presented at the 1990 SPIE/SPSE Symposium of Electronic Imaging Science and Technology, Feb. 12, 1990, Santa Clara, Calif. However, the recursive properties of the scaled DCT have not been mentioned in the previous publications. Subsequently, H. S. Hou described the recursive properties of the scaled DCT in radix-2 formulations in the article, "Recursive Scaled-DCT," presented at the 1991 SPIE International Symposium, conference 1567, Jul. 22, 1991, San Diego, Calif.

The goal of previous DCT algorithms with the scaled DCT included is to reduce the number of multiplications in the processor. But the fastest processors today are based on the fused multiply and add operations in pipeline architectures. In the fused multiply and add operations, a multiplication and an addition in the form of a+bc can be performed in one instruction cycle. For example, according to the current specification of the microprocessor i860 from Intel, a 32-bit fused multiply and add operation takes 20 nsec, whereas a single 32-bit multiply or a single 32-bit add also takes 20 nsec. Hence, there is a net gain in processing speed if we can take advantage of these architectures for implementation of the scaled DCT. E. Feig and E. Linzer have described the result of using the fused multiply and add architecture in performing an 8-point scaled DCT in their article, "Scaled DCT Algorithms for JPEG and MPEG Implementations on Fused Multiply/Add Architectures," presented in SPIE conferences, 1991. Again the recursive nature of the scaled DCT has not been considered for the selection of different sizes of image blocks under program control.

All the recursive DCT algorithms published today are in radix-2 forms, i.e., splitting an Nth order DCT into two (N/2)th order DCT. Yet, it is known in fast Fourier transforms and fast Hartley transforms that split-radix algorithms give the fastest operations. But no corresponding split-radix DCT has been known to exist in the state-of-the-art. This invention discloses the split-radix algorithm and the implementation schemes for processing the regular DCT and the scaled DCT.

Due to the fact that the number of arithmetic operations in performing a DCT grows faster than linearly proportional to the number of input, from both the speed performance and the design flexibility viewpoints, it is desirable to use the recursive algorithms for both the DCT and the scaled DCT. In so doing, one can process a combination of lower order DCT instead of a higher order DCT by itself. In the radix-2 recursive DCT algorithm, an Nth order DCT contains two (N/2)th order DCT; whereas in the radix-2 recursive scaled DCT algorithm, an Nth order scaled DCT contains one (N/2)th order scaled DCT and one (N/2)th order scaled IDCT. The disclosed split-radix DCT and the split-radix scaled DCT algorithms are further improvements of the radix-2 algorithms, because in the split-radix DCT algorithm an Nth order DCT contains an (N/2)th order DCT and two (N/4)th order IDCT, whereas in the split-radix scaled DCT algorithms an Nth order scaled DCT contains an (N/2)th order scaled DCT and two (N/4)th order modified scaled IDCT.

SUMMARY OF THE INVENTION

The present invention is a special purpose processor and method of computation for performing an N-length discrete cosine transform or the scaled discrete cosine transform in split-radix algorithm. In accordance with the invented split-radix algorithm, the N-length DCT can be realized with an (N/2)th order DCT and two (N/4)th order IDCT. Similarly, an N-length IDCT can be realized with an (N/2)th order IDCT and two (N/4)th order DCT. In particular, the signal flowgraphs for both the forward and inverse scaled DCT have been implemented with fused multiply and add operations in pipeline architectures. These embodiments not only have the least number of fused arithmetic operations in processing two-dimensional input blocks but also have the flexibility of processing input blocks of different size.

DETAILED DESCRIPTION OF THE INVENTION

Figure 1:
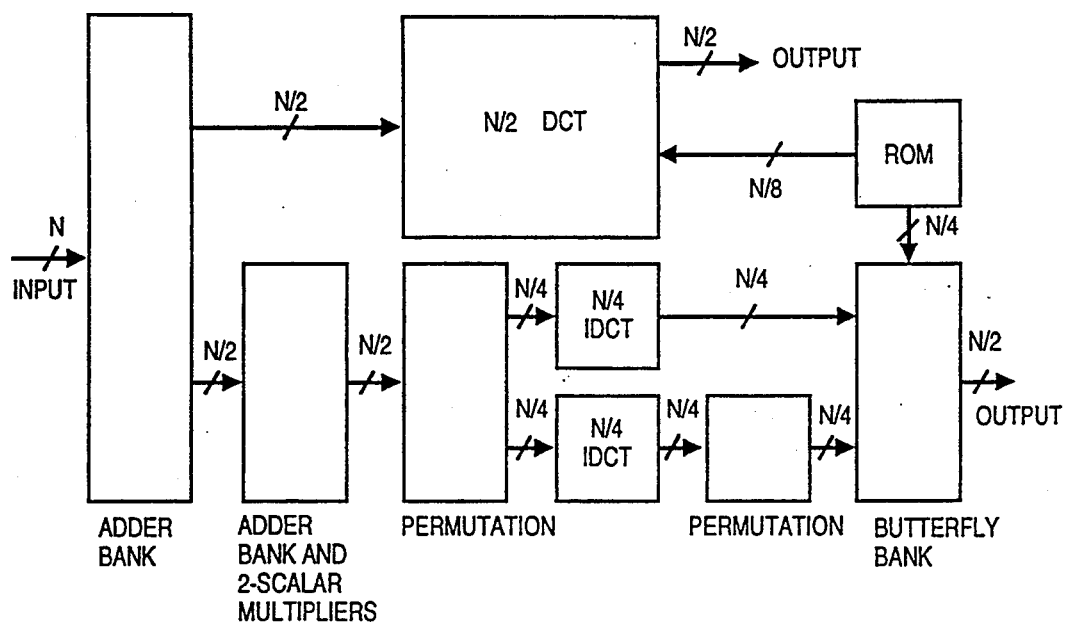
FIG. 1 is an electrical circuit block diagram of the one-dimensional split-radix DCT of order N.

In the following we provide a rigorous derivation of the algorithm to be implemented in the reduced instruction set computer (RISC) architecture, in which the multiplication and addition pair can be performed in one instruction cycle. Therefore, the goal of the following derivations is to obtain as few multiplications and additions as possible, to be operated in pairs.

The derivations of the algorithm start with the regular DCT in radix-2 form. We then obtain the split-radix DCT algorithm which constitutes the theoretical foundation of this invention. Finally, both the forward and inverse split-radix scaled DCT algorithms are derived for physical implementations in RISC architecture. The signal flow-graphs accompanied by the formulations further illustrate the electrical connections between the fused multiply and add processing units.

1. REGULAR RECURSIVE DCT

According to the definition of DCT, for a given data sequence $\{x_n; n=0, 1, 2, \ldots, N-1\}$, the DCT data sequence $\{z_k; k=0, 1, 2, \ldots, N-1\}$ is given by the following relation:

$$z_k(N,x) = \sqrt{\frac{2}{N}} \epsilon_k \sum_{n=0}^{N-1} x_n \cos[\pi(2n+1)k/2N] \quad (1)$$

for $k = 0, 1, 2, \ldots, N-1$ where $$\epsilon_k = \begin{cases} \frac{1}{\sqrt{2}} & \text{for } k = 0 \\ 1 & \text{otherwise} \end{cases}$$

The DCT defined in Eq. (1) can be written in matrix form as $$\underline{z} = T(N)\underline{x} \quad (2)$$

where $\underline{x}$ and $\underline{z}$ are column vectors denoting the input and DCT data sequences arranged in natural order. $T(N)$ is used to designate the DCT matrix of order N where we have assumed that N is a power of 2. Clearly, $T(N)$ is unitary. Based on the derivations in Reference 1, we obtain the orthonormal DCT defined in Eq. (2) as $$\begin{bmatrix} \underline{z}_e \\ \underline{z}_o \end{bmatrix} = \frac{1}{\sqrt{2}} \begin{bmatrix} T & T \\ D & -D \end{bmatrix} \begin{bmatrix} \underline{x}_p \\ \bar{I}\underline{x}_r \end{bmatrix} \quad (3)$$

where $\underline{x}_p$ and $\underline{x}_r$ are the previous half and the recent half of the input data sequence for which $\underline{x}$ is arranged in natural order; and $$\underline{z}_e = [z_0, z_2, z_4, \ldots z_{N-2}]^t$$

$$\underline{z}_o = [z_1, z_3, z_5, \ldots z_{N-1}]^t$$

The $\underline{z}_e$ and $\underline{z}_o$ are the even half and the odd half of the output data vector $\underline{z}$ for which $\underline{z}$ is arranged in natural sequence, and $\bar{I}$ denotes the identify matrix that has been rotated by 90°, i.e., $$\bar{I} = \begin{bmatrix} 0 & & & & 1 \\ & & & 1 & \\ & & \cdot & & \\ & & \cdot & & \\ & 1 & & & \\ 1 & & & & 0 \end{bmatrix}$$

Clearly, the first recursive form for the DCT matrix as defined by Eq. (2) is $$T(N) = \frac{1}{\sqrt{2}} P(N) \begin{bmatrix} T\left(\frac{N}{2}\right) & 0 \\ 0 & D\left(\frac{N}{2}\right) \end{bmatrix} \begin{bmatrix} I & \bar{I} \\ I & -\bar{I} \end{bmatrix} \quad (4)$$

where the permutation matrix $P(N)$ is to bring the even numbered elements to the upper half and the odd numbered to the lower half, i.e., $$\underline{z} = P(N) \begin{bmatrix} \underline{z}_e \\ \underline{z}_o \end{bmatrix} \quad (5)$$

For example $$P(8) = \begin{bmatrix} 1 & 0 & 0 & 0 & | & 0 & 0 & 0 & 0 \\ 0 & 0 & 0 & 0 & | & 1 & 0 & 0 & 0 \\ 0 & 1 & 0 & 0 & | & 0 & 0 & 0 & 0 \\ 0 & 0 & 0 & 0 & | & 0 & 1 & 0 & 0 \\ \hline 0 & 0 & 1 & 0 & | & 0 & 0 & 0 & 0 \\ 0 & 0 & 0 & 0 & | & 0 & 0 & 1 & 0 \\ 0 & 0 & 0 & 1 & | & 0 & 0 & 0 & 0 \\ 0 & 0 & 0 & 0 & | & 0 & 0 & 0 & 1 \end{bmatrix} \quad (6)$$

2. THE BASIC SPLIT-RADIX DCT ALGORITHM

Based on the basic definition of DCT given in Eq. (1), the transformation corresponding to D in Eqs. (3) or (4) is given by $$d_p = \sqrt{\frac{2}{N}} \sum_{m=0}^{M-1} f_m \cos \frac{(2p+1)(2m+1)\pi}{4M} \quad (7)$$

for $p = 0, 1, 2, \ldots, M-1$ ($M = N/2$), where in Eq. (7)

$$f_m = x_m - x_{N-m-1}$$

The right-hand side of Eq. (7) can be decomposed into two parts as $$d_p = \sqrt{\frac{2}{N}} \cos \frac{(2p+1)\pi}{4M} \sum_{m=0}^{M-1} f_m \cos \frac{(2m+1)\pi}{2M} \quad (8)$$

$$- \sqrt{\frac{2}{N}} \sin \frac{(2p+1)\pi}{4M} \sum_{m=0}^{M-1} f_m \sin \frac{(2p+1)m\pi}{2M}$$

Now let $$\underline{g} = \hat{P}(M) \hat{B}(M) \underline{f} \quad (9)$$

and $$\underline{d} = \hat{R}(M) \underline{y} \quad (10)$$

where $\underline{d}$ is a column vector with components $d_p$, and matrices $\hat{P}(M)$, $\hat{B}(M)$, and $\hat{R}(M)$ are defined respectively by $$\hat{P}(M) = \begin{bmatrix} 1 & 0 & 0 & 0 & 0 & 0 & \ldots & 0 & 0 \\ 0 & 0 & 1 & 0 & 0 & 0 & \ldots & 0 & 0 \\ 0 & 0 & 0 & 0 & 1 & 0 & \ldots & 0 & 0 \\ 0 & 0 & 0 & 0 & 0 & 1 & \ldots & 0 & 0 \\ \cdot & & & & & & & 0 & 1 & 0 \\ 0 & \ldots & & 0 & 0 & 0 & 0 & 0 & 0 & 1 \\ 0 & \ldots & & & 0 & 0 & 0 & 0 & 1 & 0 & 0 \\ 0 & \ldots & & & 0 & 0 & 1 & 0 & 0 & 0 & 0 \\ 0 & \ldots & & 0 & 1 & 0 & 0 & 0 & 0 & 0 & 0 \\ \cdot & & & & & & & & & \\ 0 & 1 & 0 & \ldots & & & & & & \end{bmatrix} \quad (11)$$

$$\hat{B}(M) = \frac{1}{\sqrt{2}} \begin{bmatrix} \sqrt{2} & & & & & \\ & 1 & -1 & & & \\ & 1 & 1 & & & \\ & & & 1 & -1 & \\ & & & 1 & 1 & \\ & & & & & \ddots \\ & & & & & & \sqrt{2} \end{bmatrix} \quad (12)$$

and $$\hat{R}(M) = \begin{bmatrix} c_1 & & & & & s_1 \\ & c_3 & & & s_3 & \\ & & c_5 & s_5 & & \\ & & \cdot & \cdot & & \\ & & s_5 & -c_5 & & \\ & s_3 & & & -c_3 & \\ s_1 & & & & & -c_1 \end{bmatrix} \quad (13)$$

where in Eq. (13)

$$c_p = \cos(p\pi/2N)$$

and $$s_p = \sin(p\pi/2N)$$

The column vector $\overline{y}$ in Eq. (10) is related to $\overline{g}$ in Eq. (9) because of Eq. (8). Thus $\overline{y}$ may be written in two parts; the first part is $$y_p = \sqrt{\frac{4}{M}} \sum_{m=0}^{M/2-1} \epsilon_m g_m \cos \frac{(2p+1)m\pi}{M} \quad (14)$$

for $p = 0, 1, 2, \ldots, M/2 - 1$. The second part is $$y_{M-1-p} = \sqrt{\frac{4}{M}} \sum_{m=1}^{M/2} \epsilon_{M/2} g_{M-m} \sin \frac{(2p+1)m\pi}{M} \quad (15)$$

Let us change m into M/2—m inside the summation in Eq. (15) to obtain $$y_{M-1-p} = \sqrt{\frac{4}{M}} (-1)^p \sum_{m=0}^{M/2-1} \epsilon_m g_{M/2+m} \cos \frac{(2p+1)m\pi}{M} \quad (16)$$

Now combining Eqs. (14) and (16) we have the following matrix equation $$\begin{bmatrix} \underline{y}_p \\ \underline{y}_r \end{bmatrix} = \begin{bmatrix} I & 0 \\ 0 & (-1)^p I \end{bmatrix} \begin{bmatrix} T^{-1}\left(\frac{M}{2}\right) & 0 \\ 0 & T^{-1}\left(\frac{M}{2}\right) \end{bmatrix} \underline{g} \quad (17)$$

Thus $$y = \begin{bmatrix} y_p \\ y_r \end{bmatrix} = \begin{bmatrix} T^t\left(\frac{M}{2}\right) & 0 \\ 0 & \hat{I}T^t\left(\frac{M}{2}\right) \end{bmatrix} \underline{g} \qquad (18)$$

where in Eq. (18)

$$\hat{I} = \begin{bmatrix} & & & & & -1 \\ & & & & 1 & \\ & & & -1 & & \\ & & 1 & & & \\ & \cdot & & & & \\ -1 & & & & & \\ 1 & & & & & \end{bmatrix} \qquad (19)$$

Substituting Eq. (9) into Eq. (18) then into Eq. (10), we obtain $$\underline{d} = R(M) \begin{bmatrix} \hat{T}^t\left(\frac{M}{2}\right) & 0 \\ 0 & \hat{I}T^t\left(\frac{M}{2}\right) \end{bmatrix} \hat{P}(M) \hat{B}(M) \underline{f} \qquad (20)$$

Therefore the D matrix in Eqs. (3) or (4) can be split into two lower order DCT matrices as $$D\left(\frac{N}{2}\right) = \hat{R}\left(\frac{N}{2}\right) \begin{bmatrix} T\left(\frac{N}{4}\right) & 0 \\ 0 & \hat{I}\left(\frac{N}{4}\right)T\left(\frac{N}{4}\right) \end{bmatrix} \hat{P}\left(\frac{N}{2}\right) \hat{B}\left(\frac{N}{2}\right) \qquad (21)$$

The realization of Eq. (4) for the Nth order DCT with the matrix D given by Eq. (21) is depicted in FIG. 1. The schematic block diagram depicted in FIG. 1 is to exhibit the architectural or functional organization of performing a one-dimensional forward split-radix DCT of order-N. The signals are flowing from left to right. The N pixel samples were input parallelly to an adder bank which consists of N units two-input adders. The top half of the adder bank output is used to perform a (N/2)th order forward DCT, in which N/8 constants in the form of real decimal numbers are required. However, these constants may be calculated beforehand and stored in the read-only memory (ROM) prior to the actual processing. The bottom half of the adder bank output, after passing through another stage of arithmetic operations consisting of N/2-2 additions, 2 scaler multiplications, and permutation, is split again into two halves. Each half is to perform a (N/4)th order inverse DCT (IDCT). The N/4 output of the first IDCT and the permutated N/4 output of the second IDCT are both fed into a butterfly bank, which consists of N/2 simultaneous multiplications with constant factors and followd by N/2 simultaneous additions. The N/2 multiplication factors used in the butterfly bank may again be calculated and stored in the ROM prior to the actual processing. Shown in two places in FIG. 1, the N output are the transform coefficients of a one-dimensional forward split-radix DCT of order-N. In other words, in the derived split-radix DCT algorithm just presented, the Nth order DCT consists of an (N/2)th order DCT and two (N/4)th order IDCT.

Due to the fact that the DCT matrix is unitary i.e., $T^{-1} = T^t$, the inverse DCT may be obtained from the transpose of T(N) given in Eq. (4) as $$T^{-1}(N) = T^t(N) = \frac{1}{\sqrt{2}} \begin{bmatrix} I & I \\ I & -I \end{bmatrix} \begin{bmatrix} T^t\left(\frac{N}{2}\right) & 0 \\ 0 & D^t\left(\frac{N}{2}\right) \end{bmatrix} P^t(N) \qquad (22)$$

where in Eq. (22) $D^t(N/2)$ can be obtained from Eq. (21) in the split-radix algorithm as $$D^t\left(\frac{N}{2}\right) = \hat{B}^t\left(\frac{N}{2}\right)\hat{P}^t\left(\frac{N}{2}\right) \begin{bmatrix} T\left(\frac{N}{4}\right) & 0 \\ 0 & -T\left(\frac{N}{4}\right)\hat{I}\left(\frac{N}{4}\right) \end{bmatrix} \hat{R}\left(\frac{N}{2}\right) \qquad (23)$$

Figure 2:
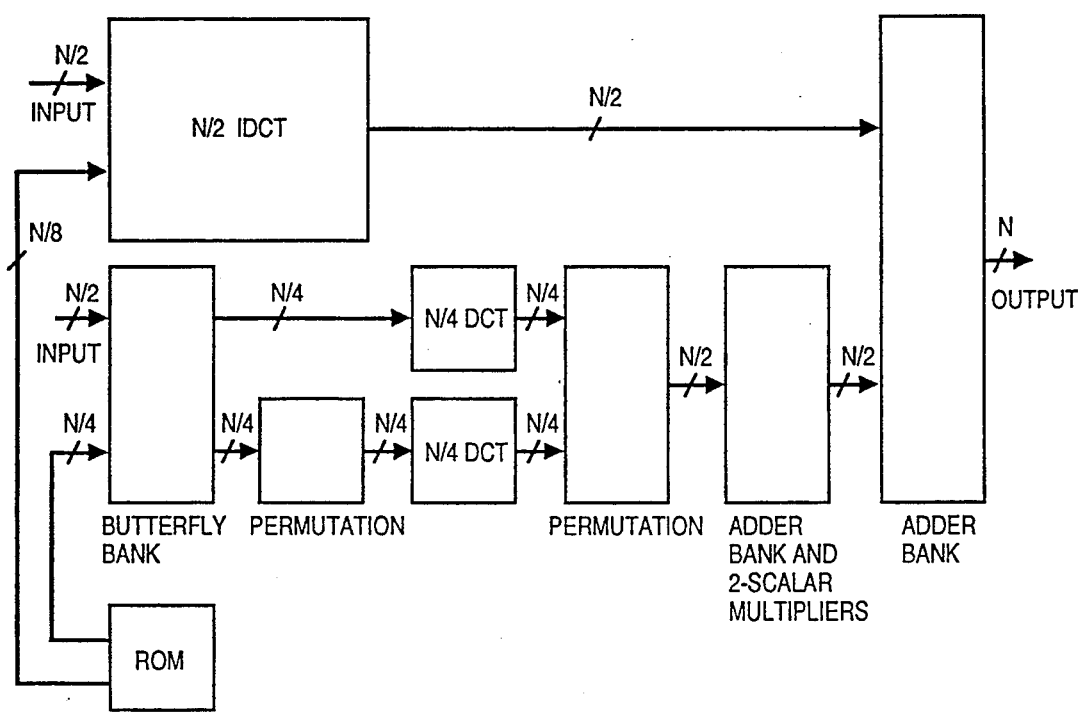
FIG. 2 is an electrical circuit block diagram of the one-dimensional split-radix IDCT of order N.

The realization of Eq. (22) for the Nth order IDCT with matrix $D^t$ given by Eq. (23) is depicted in FIG. 2. The schematic block diagram depicted in FIG. 2 is to exhibit the architectural or functional organization of performing a one-dimensional inverse split-radix DCT of order-N. Shown in two places in FIG. 2, the input are the DCT transform coefficients while the output are the pixel samples. The signals in FIG. 2 are flowing from left to right. Functionally, the inverse DCT (IDCT) is to perform the exactly inverse operation of the forward DCT. Hence, the block diagram shown in FIG. 2 is a mirror image of FIG. 1. Notice that the DCT and IDCT blocks in FIG. 1 have been replaced by corresponding IDCT and DCT blocks in FIG. 2, while the other blocks remain unchanged functionally. Clearly it can be seen that it consists of an (N/2)th order IDCT and two (N/4)th order DCT.

3. THE FORWARD SPLIT-RADIX SCALED DCT

Based on the recursive DCT relation given in Eq. (4) and the split-radix relation in Eq. (21), we can derive the forward split-radix algorithm for the scaled DCT to be implemented by fused multiply and add operations in the following steps:

(a) In reference to the previous scaled DCT articles, the DCT matrix may be factored out as $$T(N) = \frac{1}{\sqrt{2}} F(N) Y(N) \qquad (24)$$

where F(N) is a diagonal matrix and Y(N) is the so-called scaled DCT matrix.

(b) We observe that scalar factors may also be factored out from the $\hat{R}T(N/2)$ in Eq. (13) as $$\hat{R}\left(\frac{N}{2}\right) = \hat{Q}\left(\frac{N}{2}\right)\begin{bmatrix} I & A\bar{I} \\ \bar{I}A & -I \end{bmatrix} \quad (25)$$

where in Eq. (25)

$$\hat{Q}\left(\frac{N}{2}\right) = \text{diag}[c_1, c_3, \ldots, c_{N/2-1}, c_{N/2-1}, \ldots, c_3, c_1]$$

for $c_i = \cos(i\pi/2N)$ and $$A\left(\frac{N}{2}\right) = \text{diag}\left[\tan\left(\frac{i\pi}{2N}\right)\right]$$

for $i = 1, 3, 5, \ldots, N/2-1$. Thus the scaled D matrix in Eq. (21) becomes $$\hat{D}\left(\frac{N}{2}\right) = \quad (26)$$

$$\begin{bmatrix} I & A\bar{I} \\ \bar{I}A & -I \end{bmatrix} \begin{bmatrix} T'\left(\frac{N}{4}\right) & 0 \\ 0 & \bar{I}T'\left(\frac{N}{4}\right) \end{bmatrix} \hat{P}\left(\frac{N}{2}\right) \hat{B}\left(\frac{N}{2}\right)$$

Now the recursive formula for the scaled DCT becomes $$Y(N) = P(N)\begin{bmatrix} Y\left(\frac{N}{2}\right) & 0 \\ 0 & \hat{D}\left(\frac{N}{2}\right) \end{bmatrix}\begin{bmatrix} I\left(\frac{N}{2}\right) & \bar{I}\left(\frac{N}{2}\right) \\ I\left(\frac{N}{2}\right) & -\bar{I}\left(\frac{N}{2}\right) \end{bmatrix} \quad (27)$$

where in Eq. (27) $\hat{D}(N/2)$ is given in Eq. (26).

To be more illustrative, we consider the following special cases for the scaled DCT to be implemented by fused multiply and add operations:

Case 1. The 4th order forward split-radix scaled DCT:
The 4th order DCT is known as given by $$T(4) = \frac{1}{\sqrt{2}} P(4) \begin{bmatrix} \alpha & \alpha & 0 & 0 \\ \alpha & -\alpha & 0 & 0 \\ 0 & 0 & \beta & \delta \\ 0 & 0 & \delta & -\beta \end{bmatrix} \begin{bmatrix} I(2) & \bar{I}(2) \\ I(2) & -\bar{I}(2) \end{bmatrix} \quad (28)$$

where in Eq. (28) $\alpha = 1/\sqrt{2}$, $\beta = \cos(\pi/8)$, $\delta = \sin(\pi/8)$, and $P(4)$ is a permutation matrix given by $$P(4) = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \quad (29)$$

Based on the above steps for factorization of $T(4)$ we have $$T(4) = \frac{1}{\sqrt{2}} P(4) \begin{bmatrix} \alpha & & & \\ & \alpha & & \\ & & \beta & \\ & & & \beta \end{bmatrix} \begin{bmatrix} 1 & 1 & 0 & 0 \\ 1 & -1 & 0 & 0 \\ 0 & 0 & 1 & t_2 \\ 0 & 0 & t_2 & -1 \end{bmatrix} \begin{bmatrix} 1 & 0 & 0 & 1 \\ 0 & 1 & 1 & 0 \\ 1 & 0 & 0 & -1 \\ 0 & 1 & -1 & 0 \end{bmatrix} \quad (30)$$

where $t_2 = \tan(\pi/8)$. Therefore the 4th order scaled DCT is $$Y(4) = P(4) \begin{bmatrix} 1 & 1 & 0 & 0 \\ 1 & -1 & 0 & 0 \\ 0 & 0 & 1 & t_2 \\ 0 & 0 & t_2 & -1 \end{bmatrix} \begin{bmatrix} 1 & 0 & 0 & 1 \\ 0 & 1 & 1 & 0 \\ 1 & 0 & 0 & -1 \\ 0 & 1 & -1 & 0 \end{bmatrix}$$

$$= P(4) \begin{bmatrix} 1 & 1 & 0 & 0 \\ 1 & -1 & 0 & 0 \\ 0 & 0 & t_2 & 1 \\ 0 & 0 & -1 & t_2 \end{bmatrix} \begin{bmatrix} 1 & 0 & 0 & 1 \\ 0 & 1 & 1 & 0 \\ 0 & 1 & -1 & 0 \\ 1 & 0 & 0 & -1 \end{bmatrix} \quad (31)$$

Figure 3:
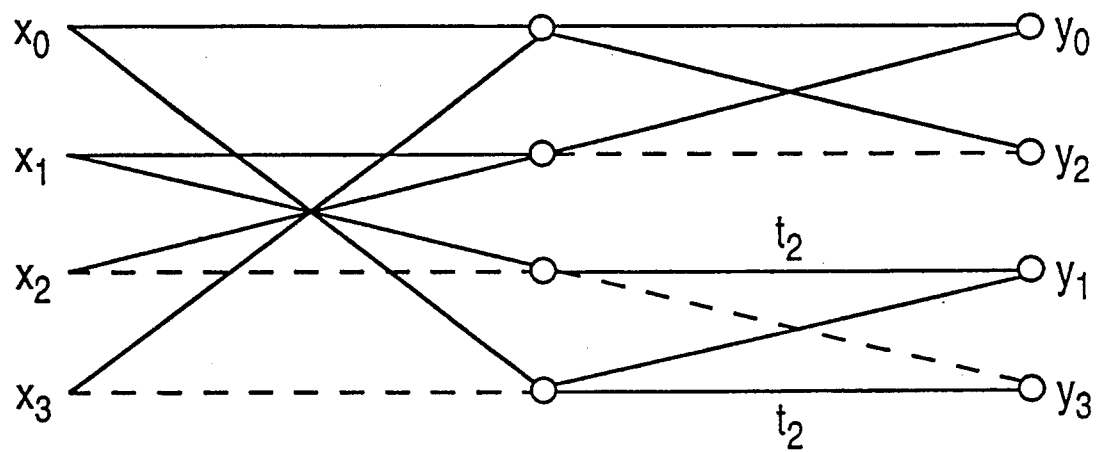
FIG. 3 is the signal flow-graph for the 4th order split-radix forward scaled DCT implemented by fused multiply and add operations; each is being represented by a circle. The solid line represents a direct connection. The dashed line represents a direct connection with sign reversal of data.

The signal flow-graph of the 4th order scaled DCT sketched according to Eq. (31) is shown in FIG. 3. It requires 8 fused multiply and add operations that are designated by circles in FIG. 3.

Case 2. The 8th order forward split-radix scaled DCT:
According to Eq. (21) and the factorization step (b) for $D(4)$, we have from Eq. (21) for $N=8$ that $$D(4) = \frac{1}{\sqrt{2}} \begin{bmatrix} \lambda & & & \\ & \delta & & \\ & & \delta & \\ & & & \lambda \end{bmatrix} \begin{bmatrix} 1 & 0 & 0 & t_1 \\ 0 & 1 & t_3 & 0 \\ 0 & t_3 & -1 & 0 \\ t_1 & 0 & 0 & -1 \end{bmatrix} \begin{bmatrix} \alpha & \alpha & 0 & 0 \\ \alpha & -\alpha & 0 & 0 \\ 0 & 0 & -\alpha & \alpha \\ 0 & 0 & \alpha & \alpha \end{bmatrix} \begin{bmatrix} 1 & 0 & 0 & 0 \\ 0 & 0 & 1 & 0 \\ 0 & 0 & 0 & 1 \\ 0 & 1 & 0 & 0 \end{bmatrix} \begin{bmatrix} \sqrt{2} & 0 & 0 & 0 \\ 0 & 1 & -1 & 0 \\ 0 & 1 & 1 & 0 \\ 0 & 0 & 0 & \sqrt{2} \end{bmatrix}$$

where $\lambda = \cos(\pi/16)$, $\gamma = \cos(3\pi/16)$, $t_1 = \tan(\pi/16)$, and $t_3 = \tan(3\pi/16)$. Thus the scaled $D(4)$ is $$\hat{D}(4) = \begin{bmatrix} 1 & 0 & 0 & t_1 \\ 0 & 1 & t_3 & 0 \\ 0 & t_3 & -1 & 0 \\ t_1 & 0 & 0 & -1 \end{bmatrix} \begin{bmatrix} \alpha & 0 & \alpha & 0 \\ \alpha & 0 & -\alpha & 0 \\ 0 & \alpha & 0 & -\alpha \\ 0 & \alpha & 0 & \alpha \end{bmatrix} \begin{bmatrix} \sqrt{2} & 0 & 0 & 0 \\ 0 & 1 & -1 & 0 \\ 0 & 1 & 1 & 0 \\ 0 & 0 & 0 & \sqrt{2} \end{bmatrix} \quad (32)$$

$$= \begin{bmatrix} 1 & 0 & 0 & t_1 \\ 0 & 1 & t_3 & 0 \\ 0 & t_3 & -1 & 0 \\ t_1 & 0 & 0 & -1 \end{bmatrix} \begin{bmatrix} 1 & \alpha & 0 & 0 \\ 1 & -\alpha & 0 & 0 \\ 0 & 0 & \alpha & -1 \\ 0 & 0 & \alpha & 1 \end{bmatrix} \begin{bmatrix} 1 & 0 & 0 & 0 \\ 0 & 1 & 1 & 0 \\ 0 & 1 & -1 & 0 \\ 0 & 0 & 0 & 1 \end{bmatrix}$$

Figure 4:
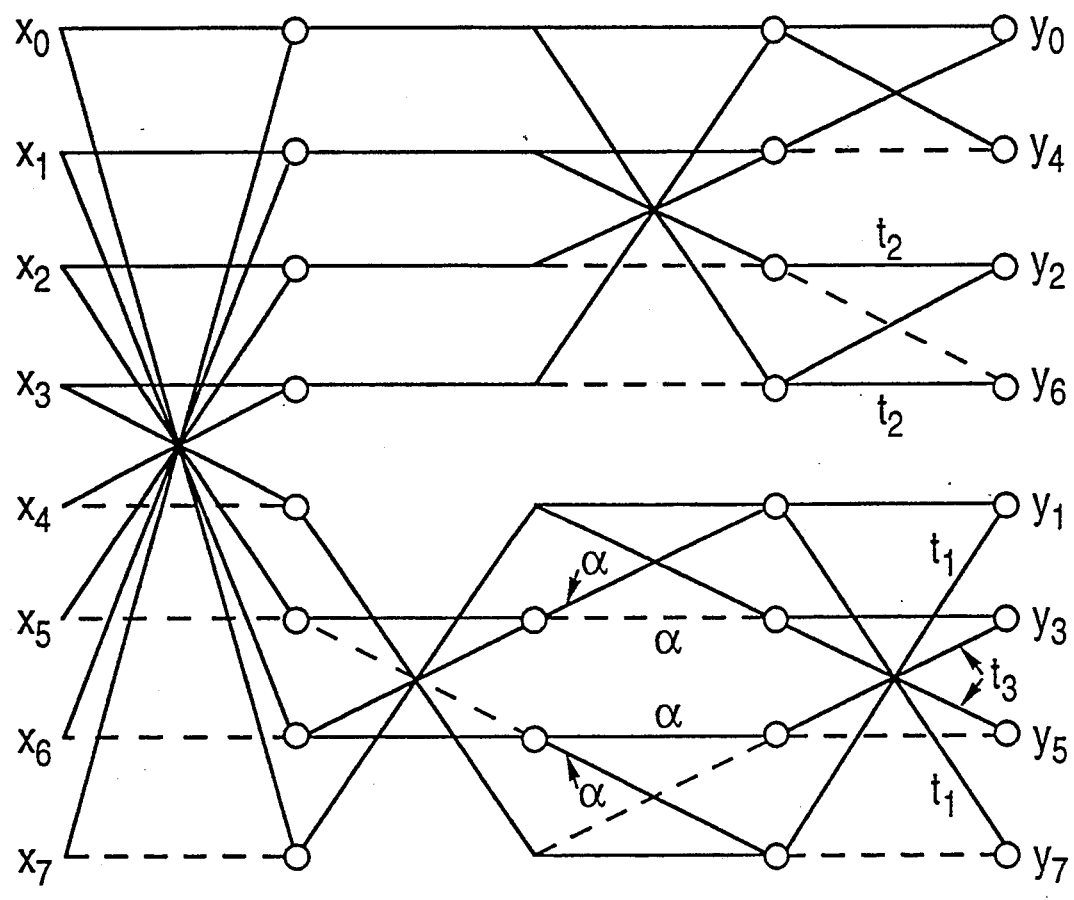
FIG. 4 is the signal flow-graph for the 8th order split-radix forward scaled DCT implemented by fused multiply and add operations.

Now the 8th order forward scaled DCT is given by $$Y(8) = P(8) \begin{bmatrix} Y(4) & 0 \\ 0 & \hat{D}(4) \end{bmatrix} \begin{bmatrix} I(4) & \bar{I}(4) \\ I(4) & -\bar{I}(4) \end{bmatrix} \quad (33)$$

where in Eq. (33) P(8) is given in Eq. (6), Y(4) in Eq. (31), and $\hat{D}(4)$ in Eq. (32). The signal flow-graph sketched according to Eq. (33) is shown in FIG. 4. It takes 26 fused multiply and add operations to implement the one-dimensional 8th order forward scaled DCT. As one can clearly see from both FIG. 3 and FIG. 4, the 4th order scaled DCT is included in the 8th order scaled DCT. This recursive property offers user flexibility of processing different sizes of input and design modularity.

Figure 5:
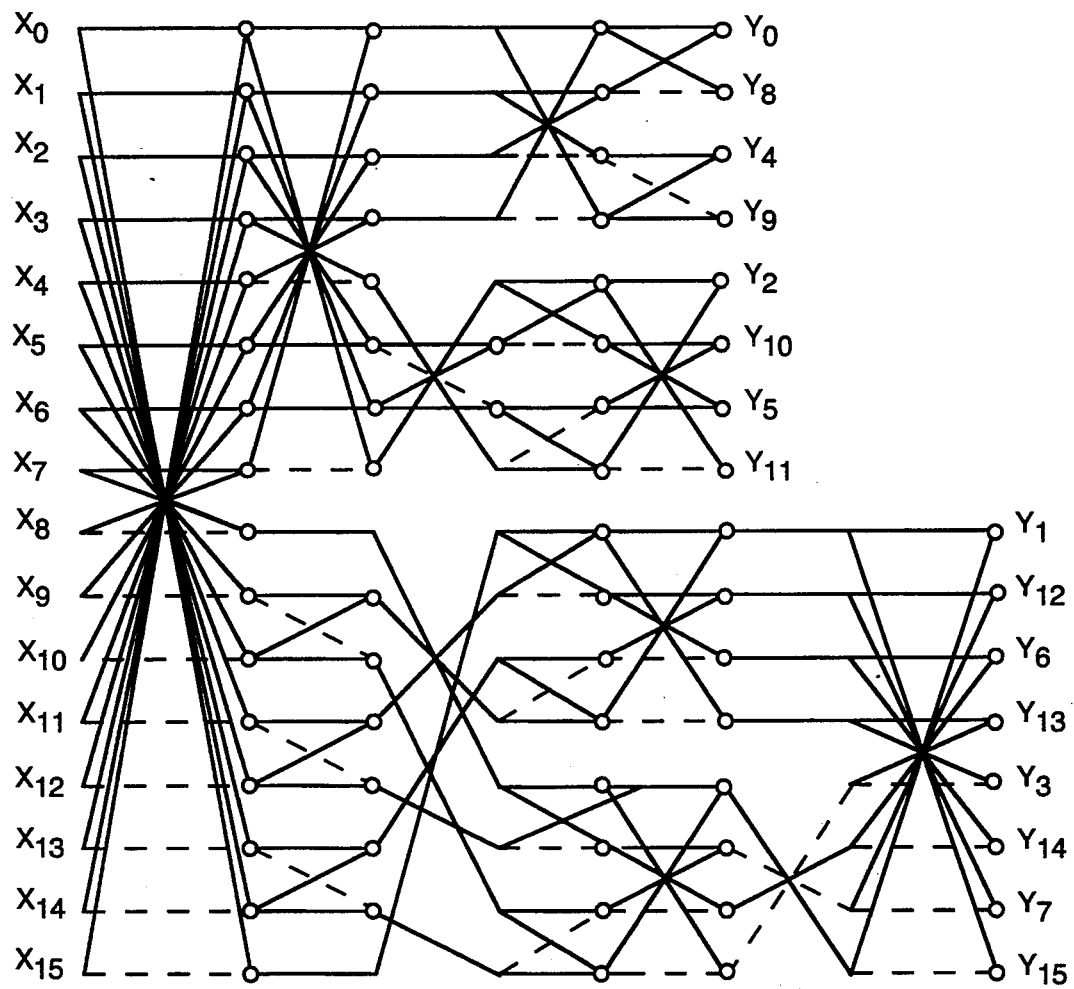
FIG. 5 is the signal flow-graph for the 16th order split-radix forward scaled DCT implemented by fused multiply and add operations.
Figure 6:
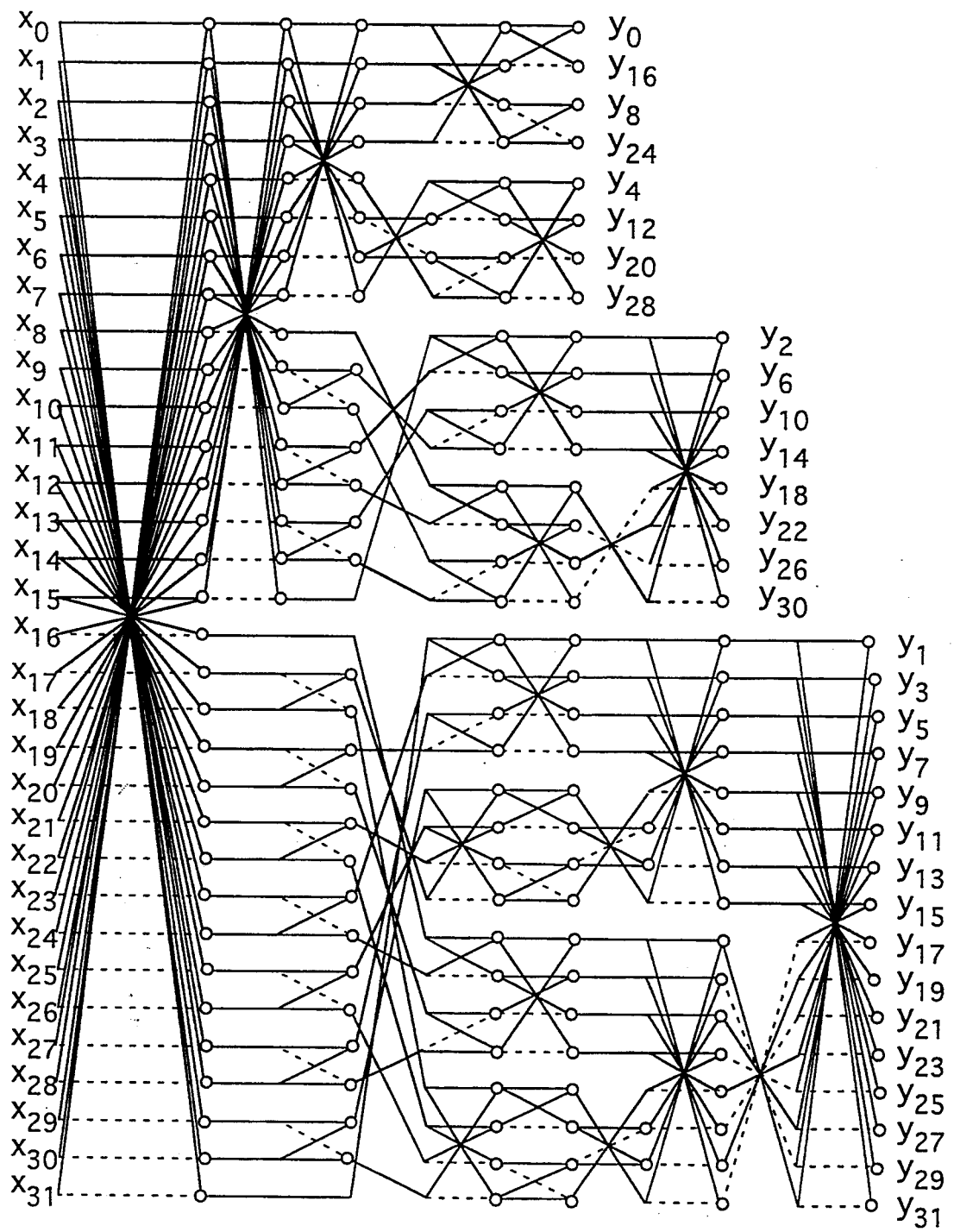
FIG. 6 is the signal flow-graph for the 32nd order split-radix forward scaled DCT implemented by fused multiply and add operations.

Repeatedly making use of the split-radix recursive formulas, we can design the 16-point and 32-point split-radix scaled DCT in the same fashion as demonstrated above for the 8th order scaled DCT. The signal flow-graphs for the 16-point and the 32-point forward split-radix scaled DCT are shown in FIGS. 5 and 6, respectively. Each circle in FIGS. 4, 5, and 6 represents a fused multiply and add operation. The fused operation at each circle location in FIGS. 5 and 6 is listed in Tables 1 and 2, respectively, where f denotes the first input (at the top) and g the second input (at the bottom) of the fused arithmetic processing unit. Moreover, in Tables 1 through 4 $t_i = \tan(i\pi/64)$, $\alpha = \cos(\pi/4)$, $\beta = \cos(\pi/8)$, $\lambda = \cos(\pi/16)$, $\gamma = \cos(3\pi/16)$, $r = \gamma/\lambda$, and $\rho = \alpha\lambda$. Again, one can clearly see from FIG. 6, the 32-point forward split-radix scaled DCT contains the 4-point, the 8-point, and the 16-point forward scaled DCT.

4. THE INVERSE SPLIT-RADIX SCALED DCT

The inverse split-radix scaled DCT can be obtained by taking the transpose of Y(N) in Eq. (27). Thus $$G(N) = \begin{bmatrix} I\left(\frac{N}{2}\right) & I\left(\frac{N}{2}\right) \\ \bar{I}\left(\frac{N}{2}\right) & -\bar{I}\left(\frac{N}{2}\right) \end{bmatrix} \begin{bmatrix} G\left(\frac{N}{2}\right) & 0 \\ 0 & \hat{D}^t\left(\frac{N}{2}\right) \end{bmatrix} P^t(N) \quad (34)$$

where in Eq. (34), G(N) is the inverse split-radix scaled DCT of order N, and $\hat{D}^t(N/2)$ is given by taking the transpose of D(N/2) in Eq. (26), i.e., $$\hat{D}^t\left(\frac{N}{2}\right) = \hat{B}^t\left(\frac{N}{2}\right) \hat{P}^t \begin{bmatrix} T\left(\frac{N}{4}\right) & 0 \\ 0 & -T\left(\frac{N}{4}\right)^{t\wedge}I \end{bmatrix} \begin{bmatrix} I & A\bar{I} \\ \bar{I}A & -I \end{bmatrix} \quad (35)$$

The multiplication factors of T(N/4) in Eq. (35) can be transferred to the left-hand side and finally be absorbed in the left most multiplying matrix $\hat{B}^t(N/2)$ on the right-hand side of Eq. (35). This procedure becomes evident in the following special cases.

Case 3. The 4th order inverse split-radix scaled DCT:
  Taking the transpose of Y(4) in Eq. (31) we have $$G(4) = Y^t(4) \begin{bmatrix} 1 & 0 & 0 & 1 \\ 0 & 1 & 1 & 0 \\ 0 & 1 & -1 & 0 \\ 1 & 0 & 0 & -1 \end{bmatrix} \begin{bmatrix} 1 & 1 & 0 & 0 \\ 1 & -1 & 1 & 0 \\ 0 & 0 & t_2 & -1 \\ 0 & 0 & 1 & t_2 \end{bmatrix} P^t(4) \quad (36)$$

Figure 7:
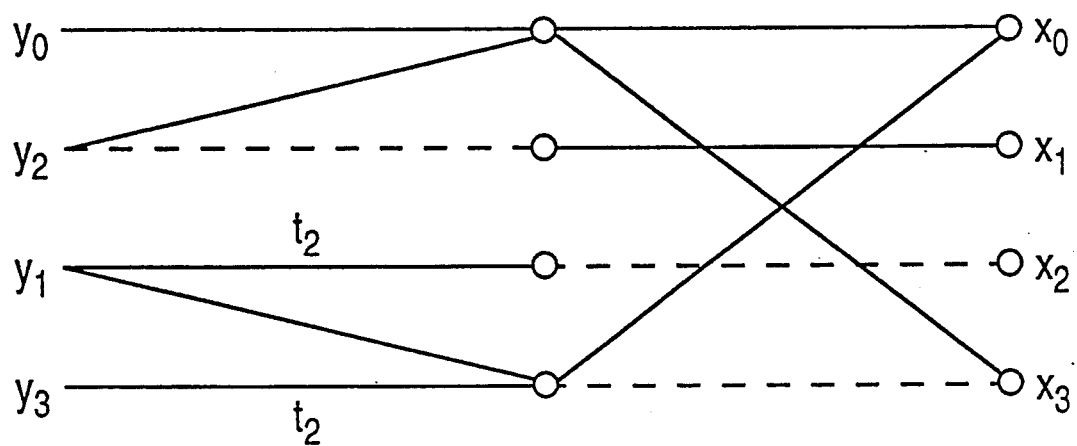
FIG. 7 is the signal flow-graph for the 4th order split-radix inverse scaled DCT implemented by fused multiply and add operations.

The signal flow-graph for the 4th order inverse split-radix scaled DCT sketched according to Eq. (36) is shown in FIG. 7. It again requires 8 fused multiply and add operations in implementation.

Case 4. The 8th order inverse split-radix scaled DCT:
  According to the recursive formula in Eq. (34) for N=8, we take the transpose of $\hat{D}(4)$ in Eq. (32) to obtain $$\hat{D}^t(4) = \begin{bmatrix} 1 & 0 & 0 & 0 \\ 0 & 1 & 1 & 0 \\ 0 & 1 & -1 & 0 \\ 0 & 0 & 0 & 1 \end{bmatrix} \begin{bmatrix} 1 & 1 & 0 & 0 \\ \alpha & -\alpha & 0 & 0 \\ 0 & 0 & \alpha & \alpha \\ 0 & 0 & -1 & 1 \end{bmatrix} \begin{bmatrix} 1 & 0 & 0 & t_1 \\ 0 & 1 & t_3 & 0 \\ 0 & t_3 & -1 & 0 \\ t_1 & 0 & 0 & -1 \end{bmatrix} \quad (37)$$

$$= \begin{bmatrix} 1 & & & \\ & \alpha & & \\ & & \alpha & \\ & & & 1 \end{bmatrix} \begin{bmatrix} 1 & 0 & 0 & 0 \\ 0 & 1 & 1 & 0 \\ 0 & 1 & -1 & 0 \\ 0 & 0 & 0 & 1 \end{bmatrix} \begin{bmatrix} 1 & 1 & 0 & 0 \\ 1 & -1 & 0 & 0 \\ 0 & 0 & 1 & 1 \\ 0 & 0 & -1 & 1 \end{bmatrix} \begin{bmatrix} 1 & 0 & 0 & t_1 \\ 0 & 1 & t_3 & 0 \\ 0 & t_3 & -1 & 0 \\ t_1 & 0 & 0 & -1 \end{bmatrix}$$

Substituting G(4) in Eq. (36) and $\hat{D}^t(4)$ in Eq. (37) to Eq. (34) for N=8, we have $$G(8) = \begin{bmatrix} 1 & 0 & 0 & 0 & | & 1 & 0 & 0 & 0 \\ 0 & 1 & 0 & 0 & | & 0 & \alpha & 0 & 0 \\ 0 & 0 & 1 & 0 & | & 0 & 0 & \alpha & 0 \\ 0 & 0 & 0 & 1 & | & 0 & 0 & 0 & 1 \\ \hline 0 & 0 & 0 & 1 & | & 0 & 0 & 0 & -1 \\ 0 & 0 & 1 & 0 & | & 0 & 0 & -\alpha & 0 \\ 0 & 1 & 0 & 0 & | & 0 & -\alpha & 0 & 0 \\ 1 & 0 & 0 & 0 & | & -1 & 0 & 0 & 0 \end{bmatrix} \begin{bmatrix} 1 & 0 & 0 & 0 & | & & & \\ 0 & 1 & 0 & 0 & | & & 0 & \\ 0 & 0 & 1 & 0 & | & & & \\ 0 & 0 & 0 & 1 & | & & & \\ \hline & & & & | & 1 & 0 & 0 & 0 \\ & 0 & & & | & 0 & 1 & 1 & 0 \\ & & & & | & 0 & 1 & -1 & 0 \\ & & & & | & 0 & 0 & 0 & 1 \end{bmatrix} \begin{bmatrix} 1 & 0 & 0 & 1 & | & & & \\ 0 & 1 & 1 & 0 & | & & 0 & \\ 0 & 1 & -1 & 0 & | & & & \\ 1 & 0 & 0 & -1 & | & & & \\ \hline & & & & | & 1 & 1 & 0 & 0 \\ & 0 & & & | & 1 & -1 & 0 & 0 \\ & & & & | & 0 & 0 & 1 & 1 \\ & & & & | & 0 & 0 & -1 & 1 \end{bmatrix} \quad (38)$$

$$\begin{bmatrix} 1 & 1 & 0 & 0 & | & & & & \\ 1 & -1 & 0 & 0 & | & & 0 & & \\ 0 & 0 & t_2 & -1 & | & & & & \\ 0 & 0 & 1 & t_2 & | & & & & \\ \hline & & & & | & 1 & 0 & 0 & t_1 \\ & 0 & & & | & 0 & 1 & t_3 & 0 \\ & & & & | & 0 & t_3 & -1 & 0 \\ & & & & | & t_1 & 0 & 0 & -1 \end{bmatrix} \begin{bmatrix} P'(4) & 0 \\ 0 & I(4) \end{bmatrix} P'(8)$$

$$= \begin{bmatrix} 1 & 0 & 0 & 0 & | & 0 & 0 & 0 & 1 \\ 0 & 1 & 0 & 0 & | & 0 & 0 & \alpha & 0 \\ 0 & 0 & 1 & 0 & | & 0 & \alpha & 0 & 0 \\ 0 & 0 & 0 & 1 & | & 1 & 0 & 0 & 0 \\ \hline 0 & 0 & 0 & 1 & | & -1 & 0 & 0 & 0 \\ 0 & 0 & 1 & 0 & | & 0 & -\alpha & 0 & 0 \\ 0 & 1 & 0 & 0 & | & 0 & 0 & -\alpha & 0 \\ 1 & 0 & 0 & 0 & | & 0 & 0 & 0 & -1 \end{bmatrix} \begin{bmatrix} 1 & 0 & 0 & 0 & | & & & \\ 0 & 1 & 0 & 0 & | & & 0 & \\ 0 & 0 & 1 & 0 & | & & & \\ 0 & 0 & 0 & 1 & | & & & \\ \hline & & & & | & 0 & 0 & 0 & 1 \\ & 0 & & & | & 0 & 1 & -1 & 0 \\ & & & & | & 0 & 1 & 1 & 0 \\ & & & & | & 1 & 0 & 0 & 0 \end{bmatrix} \begin{bmatrix} 1 & 0 & 0 & 1 & | & & & \\ 0 & 1 & 1 & 0 & | & & 0 & \\ 0 & 1 & -1 & 0 & | & & & \\ 1 & 0 & 0 & -1 & | & & & \\ \hline & & & & | & 1 & 1 & 0 & 0 \\ & 0 & & & | & 1 & -1 & 0 & 0 \\ & & & & | & 0 & 0 & 1 & 1 \\ & & & & | & 0 & 0 & -1 & 1 \end{bmatrix}$$

$$\begin{bmatrix} 1 & 1 & 0 & 0 & | & & & & \\ 1 & -1 & 0 & 0 & | & & 0 & & \\ 0 & 0 & t_2 & -1 & | & & & & \\ 0 & 0 & 1 & t_2 & | & & & & \\ \hline & & & & | & 1 & 0 & 0 & t_1 \\ & 0 & & & | & 0 & 1 & t_3 & 0 \\ & & & & | & 0 & t_3 & -1 & 0 \\ & & & & | & t_1 & 0 & 0 & -1 \end{bmatrix} \dot{P}(8)$$

where in Eq. (38) $\dot{P}(8)$ is a permutation matrix defined by $$\dot{P}(8) = P(8) \begin{bmatrix} P(4) & 0 \\ 0 & I(4) \end{bmatrix} = \begin{bmatrix} 1 & 0 & 0 & 0 & | & 0 & 0 & 0 & 0 \\ 0 & 0 & 0 & 0 & | & 1 & 0 & 0 & 0 \\ 0 & 0 & 1 & 0 & | & 0 & 0 & 0 & 0 \\ 0 & 0 & 0 & 0 & | & 0 & 1 & 0 & 0 \\ \hline 0 & 1 & 0 & 0 & | & 0 & 0 & 0 & 0 \\ 0 & 0 & 0 & 0 & | & 0 & 0 & 1 & 0 \\ 0 & 0 & 0 & 1 & | & 0 & 0 & 0 & 0 \\ 0 & 0 & 0 & 0 & | & 0 & 0 & 0 & 1 \end{bmatrix}$$

Figure 8:
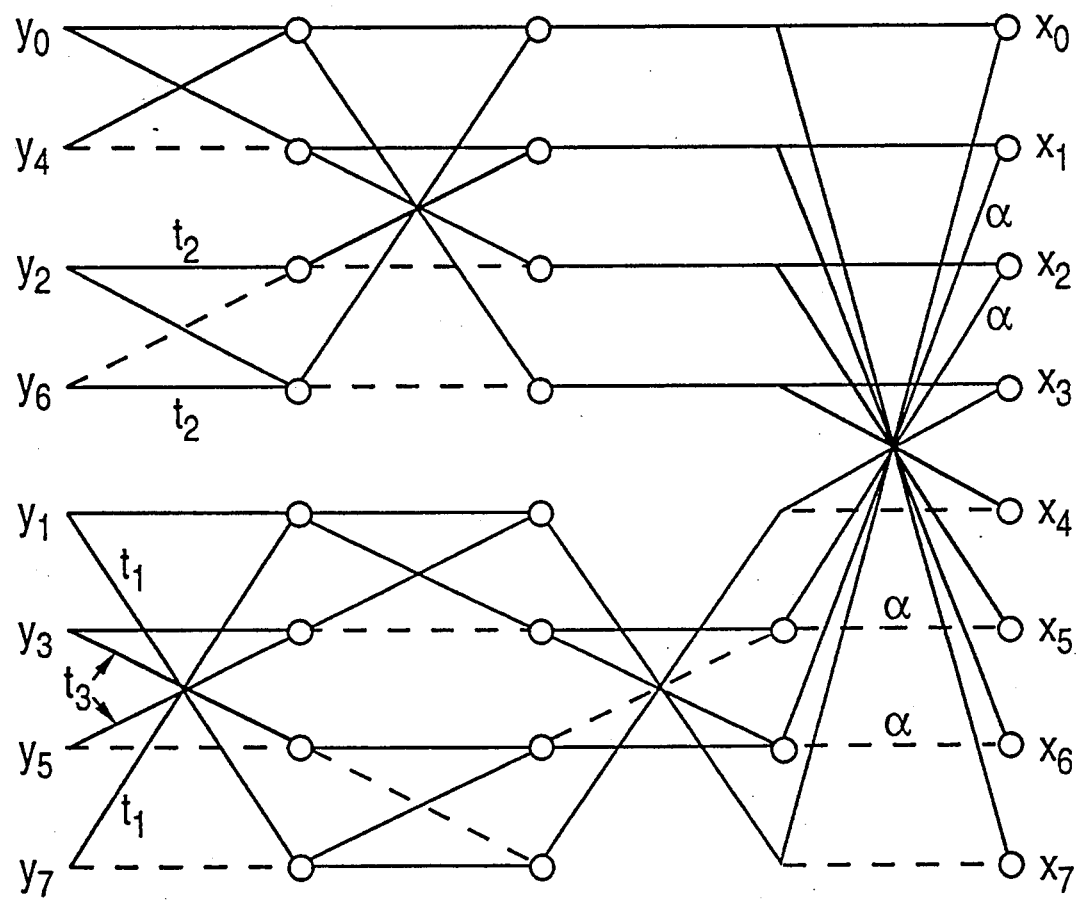
FIG. 8 is the signal flow-graph for the 8th order split-radix inverse scaled DCT implemented by fused multiply and add operations.

The signal flow-graph for the split-radix inverse 8th order scaled DCT sketched according to Eq. (38) is shown in FIG. 8. Again, it takes 26 fused multiply and add operations and contains the 4th order inverse scaled DCT.

Figure 9:
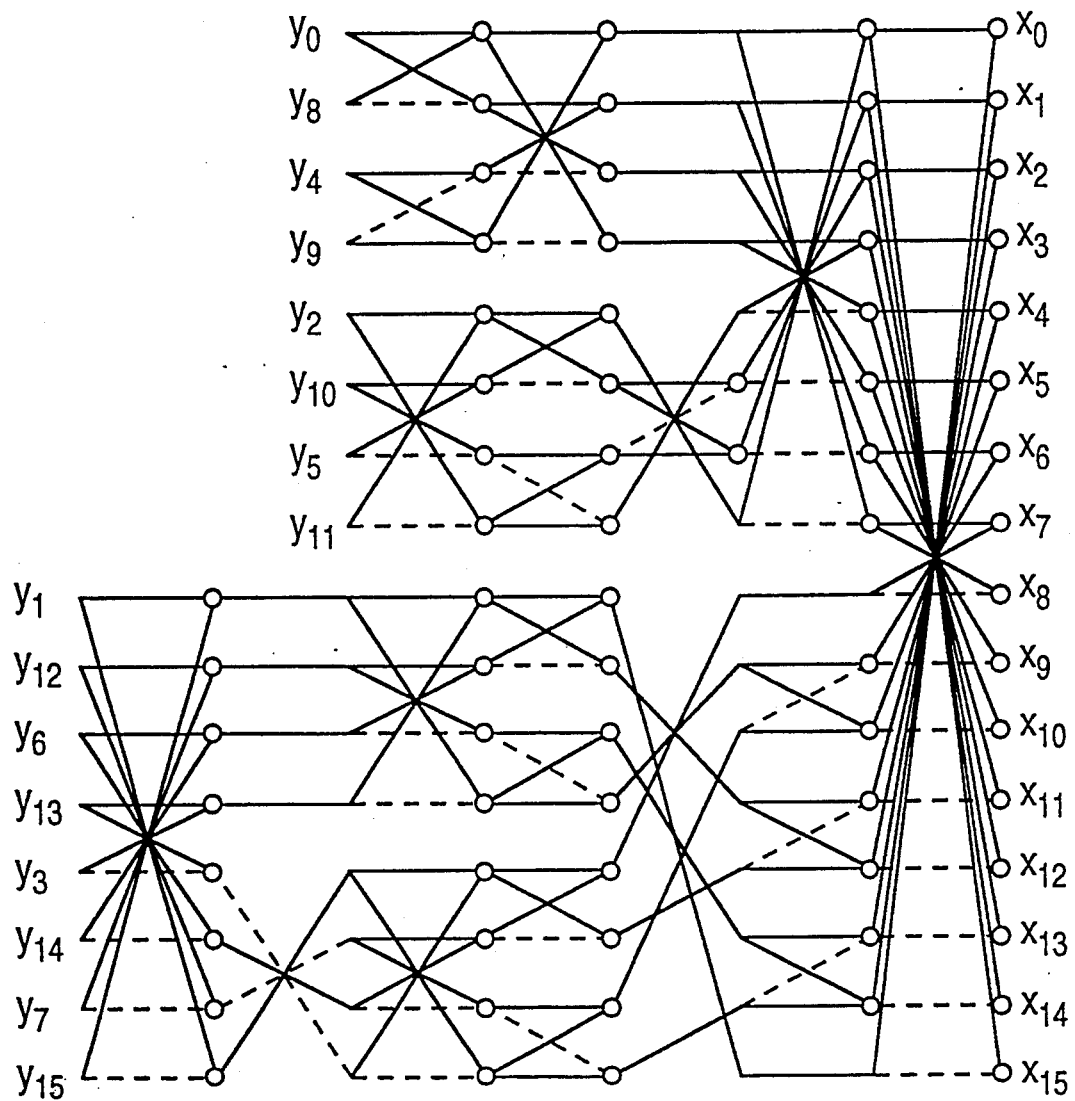
FIG. 9 is the signal flow-graph for the 16th order split-radix inverse scaled DCT implemented by fused multiply and add operations.
Figure 10:
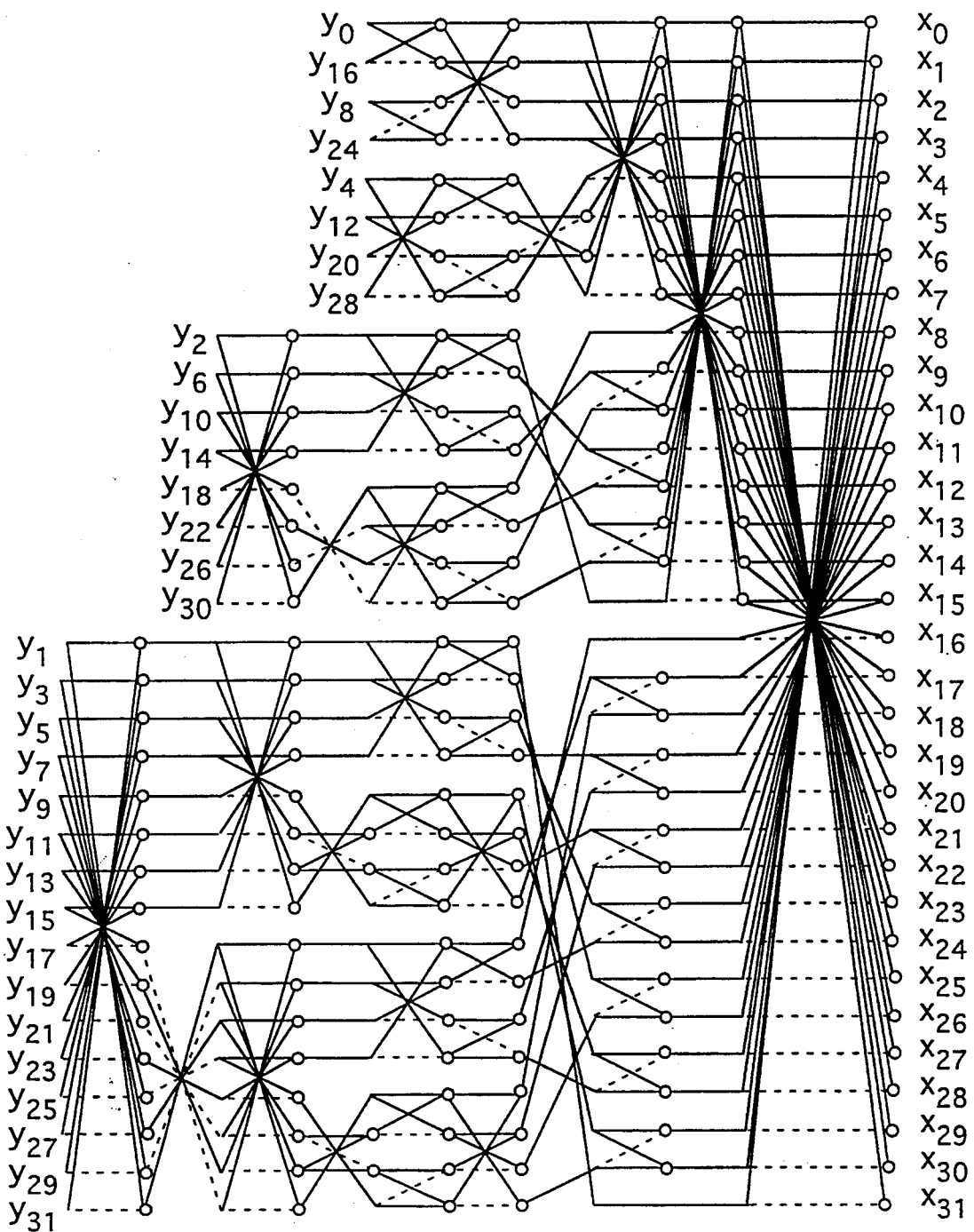
FIG. 10 is the signal flow-graph for the 32nd order split-radix inverse scaled DCT implemented by fused multiply and add operations.

Similarly as in the forward split-radix scaled DCT cases, we can use the recursive formulas given above to derive the signal flow-graphs for the 16-point and 32-point split-radix inverse scaled DCT. These are shown in FIGS. 9 and 10, respectively. Again, each circle in FIGS. 9 and 10 denotes a fused multiply and add operation. The fused operation at each circle location in FIGS. 9 and 10 is listed in Tables 3 and 4 respectively. As expected, the 32-point split-radix inverse scaled DCT contains the 4-point, the 8-point, and the 16-point inverse scaled DCT.

Although the invention has been described in terms of a preferred embodiment, it will be obvious to those skilled in the art that alterations and modifications may be made without departing from the invention. Accordingly, it is intended that all such alterations and modifications be included within the spirit and scope of the invention as defined by file appended claims.

TABLE 1

Fused Operations in 16-Point Forward Scaled DCT

| Row # | Column # 1 | 2 | 3 | 4 | 5 | 6 |
|---|---|---|---|---|---|---|
| 1 | $f + g$ | $f + g$ | | $f + g$ | $f + g$ | |
| 2 | $f + g$ | $f + g$ | | $f + g$ | $f - g$ | |
| 3 | $f + g$ | $f + g$ | | $f - g$ | $t_8 f + g$ | |
| 4 | $f + g$ | $f + g$ | | $f - g$ | $-f + t_8 g$ | |
| 5 | $f + g$ | $f - g$ | | $f + \alpha g$ | $f + t_4 g$ | |
| 6 | $f + g$ | $f - g$ | $f + g$ | $f - \alpha g$ | $f + t_{12} g$ | |
| 7 | $f + g$ | $f - g$ | $-f - g$ | $\alpha f - g$ | $t_{12} f - g$ | |
| 8 | $f + g$ | $f - g$ | | $\alpha f + g$ | $t_4 f - 9$ | |
| 9 | $f - g$ | | | $f + \alpha g$ | $f + \beta g$ | $f + t_2 g$ |
| 10 | $f - g$ | $f + g$ | | $f - \alpha g$ | $f + \beta g$ | $f + t_6 g$ |
| 11 | $f - g$ | $-f + g$ | | $t_8 f - g$ | $f - \beta g$ | $f + t_{10} g$ |
| 12 | $f - g$ | $f + g$ | | $f + t_8 g$ | $f - \beta g$ | $f + t_{14} g$ |
| 13 | $f - g$ | $-f + g$ | | $f + \alpha g$ | $f + \beta g$ | $t_{14} f - g$ |
| 14 | $f - g$ | $f + g$ | | $f - \alpha g$ | $f + \beta g$ | $t_{10} f - g$ |
| 15 | $f - g$ | $-f + g$ | | $t_8 f - g$ | $f - \beta g$ | $t_6 f - g$ |
| 16 | $f - g$ | | | $f + t_8 g$ | $f - \beta g$ | $t_2 f - g$ |

TABLE 2

Fused Operations in 32-Point Forward Scaled DCT

| Row # | Column # 1 | 2 | 3 | 4 | 5 | 6 | 7 | 8 | 9 |
|---|---|---|---|---|---|---|---|---|---|
| 1 | $f + g$ | $f + g$ | $f + g$ | | $f + g$ | $f + g$ | | | |
| 2 | $f + g$ | $f + g$ | $f + g$ | | $f + g$ | $f - g$ | | | |
| 3 | $f + g$ | $f + g$ | $f + g$ | | $f - g$ | $t_8 f + g$ | | | |
| 4 | $f + g$ | $f + g$ | $f + g$ | | $f - g$ | $-f + t_8 g$ | | | |
| 5 | $f + g$ | $f + g$ | $f - g$ | | $f + \alpha g$ | $f + t_4 g$ | | | |
| 6 | $f + g$ | $f + g$ | $f - g$ | $f + g$ | $f - \alpha g$ | $f + t_{12} g$ | | | |
| 7 | $f + g$ | $f + g$ | $f - g$ | $-f + g$ | $\alpha f - g$ | $t_{12} f - g$ | | | |
| 8 | $f + g$ | $f + g$ | $f - g$ | | $\alpha f + g$ | $t_4 f - g$ | | | |
| 9 | $f + g$ | $f - g$ | | | $f + \alpha g$ | $f + \beta g$ | | $f + t_2 g$ | |
| 10 | $f + g$ | $f - g$ | $f + g$ | | $f - \alpha g$ | $f + \beta g$ | | $f + t_6 g$ | |
| 11 | $f + g$ | $f - g$ | $-f + g$ | | $t_8 f - g$ | $f - \beta g$ | | $f + t_{10} g$ | |
| 12 | $f + g$ | $f - g$ | $f + g$ | | $f + t_8 g$ | $f - \beta g$ | | $f + t_{14} g$ | |
| 13 | $f + g$ | $f - g$ | $-f + g$ | | $f + \alpha g$ | $f + \beta g$ | | $t_{14} f - g$ | |
| 14 | $f + g$ | $f - g$ | $f + g$ | | $f - \alpha g$ | $f + \beta g$ | | $t_{10} f - g$ | |
| 15 | $f + g$ | $f - g$ | $-f + g$ | | $t_8 f - g$ | $f - \beta g$ | | $t_6 f - g$ | |
| 16 | $f + g$ | $f - g$ | | | $f + t_8 g$ | $f - \beta g$ | | $t_2 f - g$ | |
| 17 | $f - g$ | | | | $f + \alpha g$ | $f + \beta g$ | | $f + \lambda g$ | $f + t_1 g$ |
| 18 | $f - g$ | | $f + g$ | | $f - \alpha g$ | $f + \beta g$ | | $f + \rho g$ | $f + t_3 g$ |
| 19 | $f - g$ | | $-f + g$ | | $t_8 f - g$ | $f - \beta g$ | | $f + \rho g$ | $f + t_5 g$ |
| 20 | $f - g$ | | $f + g$ | | $f + t_8 g$ | $f - \beta g$ | | $f + \lambda g$ | $f + t_7 g$ |
| 21 | $f - g$ | | $-f + g$ | | $f + t_4 g$ | $f + r g$ | | $f - \lambda g$ | $f + t_9 g$ |
| 22 | $f - g$ | | $f + g$ | | $f + t_{12} g$ | $f - r g$ | $f - g$ | $f - \rho g$ | $f + t_{11} g$ |
| 23 | $f - g$ | | $-f + g$ | | $t_{12} f - g$ | $r f + g$ | $f + g$ | $f - \rho g$ | $f + t_{13} g$ |
| 24 | $f - g$ | | $f + g$ | | $t_4 f - g$ | $-r f + g$ | | $f - \lambda g$ | $f + t_{15} g$ |
| 25 | $f - g$ | | $-f + g$ | | $f + \alpha g$ | $f + \beta g$ | | $f + \lambda g$ | $t_{15} f - g$ |
| 26 | $f - g$ | | $f + g$ | | $f - \alpha g$ | $f + \beta g$ | | $f + \rho g$ | $t_{13} f - g$ |
| 27 | $f - g$ | | $-f + g$ | | $t_8 f - g$ | $f - \beta g$ | | $f + \rho g$ | $t_{11} f - g$ |
| 28 | $f - g$ | | $f + g$ | | $f + t_8 g$ | $f - \beta g$ | | $f + \lambda g$ | $t_9 f - g$ |
| 29 | $f - g$ | | $-f + g$ | | $f + t_4 g$ | $f + r g$ | | $f - \lambda g$ | $t_7 f - g$ |
| 30 | $f - g$ | | $f + g$ | | $f + t_{12} g$ | $f - r g$ | $f - g$ | $f - \rho g$ | $t_5 f - g$ |
| 31 | $f - g$ | | $-f + g$ | | $t_{12} f - g$ | $r f + g$ | $f + g$ | $f - \rho g$ | $t_3 f - g$ |
| 32 | $f - g$ | | | | $t_4 f - g$ | $-r f + g$ | | $f - \lambda g$ | $t_1 f - g$ |

TABLE 3

Fused Operations in 16-Point Inverse Scaled DCT

| Row # | Column # 1 | 2 | 3 | 4 | 5 | 6 |
|---|---|---|---|---|---|---|
| 1 | | $f + g$ | $f + g$ | | $f + g$ | $f + g$ |
| 2 | | $f - g$ | $f + g$ | | $f + \alpha g$ | $f + \beta g$ |
| 3 | | $t_8 f - g$ | $f - g$ | | $f + \alpha g$ | $f + \beta g$ |
| 4 | | $f + t_8 g$ | $f - g$ | | $f + g$ | $f + \alpha g$ |
| 5 | | $f + t_4 g$ | $f + g$ | | $f - g$ | $f + \alpha g$ |
| 6 | | $f + t_{12} g$ | $f - g$ | $f - g$ | $f - \alpha g$ | $f + \beta g$ |
| 7 | | $t_{12} f - g$ | $f + g$ | $t + g$ | $f - \alpha g$ | $f + \beta g$ |
| 8 | | $t_{14} f - g$ | $-f + g$ | | $f - g$ | $f + g$ |
| 9 | $f + t_2 g$ | $f + g$ | $f + g$ | | | $f - g$ |
| 10 | $f + t_6 g$ | $f + g$ | $f - g$ | | $f - g$ | $f - \beta g$ |
| 11 | $f + t_{10} g$ | $f - g$ | $t_8 f + g$ | | $f + g$ | $f - \beta g$ |
| 12 | $f + t_{14} g$ | $f - g$ | $-f + t_8 g$ | | $f - g$ | $f - \alpha g$ |

TABLE 3-continued

Fused Operations in 16-Point Inverse Scaled DCT

| Row # | 1 | 2 | 3 | 4 | 5 | 6 |
|---|---|---|---|---|---|---|
| 13 | $t_{14}f - g$ | $f + g$ | $f + g$ | | $f + g$ | $f - \alpha g$ |
| 14 | $t_{10}f - g$ | $f + g$ | $f - g$ | | $f - g$ | $f - \beta g$ |
| 15 | $t_6 f - g$ | $f - g$ | $t_8 f + g$ | | $f + g$ | $f - \beta g$ |
| 16 | $t_2 f - g$ | $f - g$ | $-f + t_8 g$ | | | $f - g$ |

TABLE 4

Fused Operations in 32-Point Inverse Scaled DCT

| Row # | 1 | 2 | 3 | 4 | 5 | 6 | 7 | 8 | 9 |
|---|---|---|---|---|---|---|---|---|---|
| 1 | | | | $f + g$ | $f + g$ | | $f + g$ | $f + g$ | $f + g$ |
| 2 | | | | $f - g$ | $f + g$ | | $f + \alpha g$ | $f + \beta g$ | $f + \lambda g$ |
| 3 | | | | $t_8 f - g$ | $f - g$ | | $f + \alpha g$ | $f + \beta g$ | $f + \lambda g$ |
| 4 | | | | $f + t_8 g$ | $f - g$ | | $f + g$ | $f + \alpha g$ | $f + \beta g$ |
| 5 | | | | $f + t_4 g$ | $f + g$ | | $f - g$ | $f + \alpha g$ | $f + \beta g$ |
| 6 | | | | $f + t_{12}g$ | $f - g$ | $f - g$ | $f - \alpha g$ | $f + \beta g$ | $f + \lambda g$ |
| 7 | | | | $t_{12}f - g$ | $f + g$ | $t + g$ | $f - \alpha g$ | $f + \beta g$ | $f + \lambda g$ |
| 8 | | | | $t_4 f - g$ | $-f + g$ | | $f - g$ | $f + g$ | $f + \alpha g$ |
| 9 | | $f + t_2 g$ | | $f + g$ | $f + g$ | | | $f - g$ | $f + \alpha g$ |
| 10 | | $f + t_6 g$ | | $f + g$ | $f - g$ | | $f - g$ | $f - \beta g$ | $f + \lambda g$ |
| 11 | | $f + t_{10}g$ | | $f - g$ | $t_8 f + g$ | | $f + g$ | $f - \beta g$ | $f + \lambda g$ |
| 12 | | $f + t_{14}g$ | | $f - g$ | $-f + t_8 g$ | | $f - g$ | $f - \alpha g$ | $f + \beta g$ |
| 13 | | $t_{14}f - g$ | | $f + g$ | $f + g$ | | $f + g$ | $f - \alpha g$ | $f + \beta g$ |
| 14 | | $t_{10}f - g$ | | $f + g$ | $f - g$ | | $f - g$ | $f - \beta g$ | $f + \lambda g$ |
| 15 | | $t_6 f - g$ | | $f - g$ | $t_8 f + g$ | | $f + g$ | $f - \beta g$ | $f + \lambda g$ |
| 16 | | $t_2 f - g$ | | $f - g$ | $-f + t_8 g$ | | | $f - g$ | $f + g$ |
| 17 | $f + t_1 g$ | $f + g$ | | $f + g$ | $f + g$ | | | | $f - g$ |
| 18 | $f + t_3 g$ | $f + g$ | | $f + g$ | $t - g$ | | $f - g$ | | $f - \lambda g$ |
| 19 | $f + t_5 g$ | $f + g$ | | $f - g$ | $t_8 f + g$ | | $f + g$ | | $f - \lambda g$ |
| 20 | $f + t_7 g$ | $f + g$ | | $f - g$ | $-f + t_8 g$ | | $f - g$ | | $f - \beta g$ |
| 21 | $f + t_9 g$ | $f - g$ | | $f + \alpha g$ | $f + t_4 g$ | | $f + g$ | | $f - \beta g$ |
| 22 | $f + t_{11}g$ | $f - g$ | $f + g$ | $f - \alpha g$ | $f + t_{12}g$ | | $f - g$ | | $f - \lambda g$ |
| 23 | $f + t_{13}g$ | $f - g$ | $-f + g$ | $\alpha f - g$ | $t_{12}f - g$ | | $f + g$ | | $f - \lambda g$ |
| 24 | $f + t_{15}g$ | $f - g$ | | $\alpha f + g$ | $t_4 f - g$ | | $f - g$ | | $f - \alpha g$ |
| 25 | $t_{15}f - g$ | $f + g$ | | $f + g$ | $f + g$ | | $f + g$ | | $f - \alpha g$ |
| 26 | $t_{13}f - g$ | $f + g$ | | $f + g$ | $f - g$ | | $f - g$ | | $f - \lambda g$ |
| 27 | $t_{11}f - g$ | $f + g$ | | $f - g$ | $t_8 f + g$ | | $f + g$ | | $f - \lambda g$ |
| 28 | $t_9 f - g$ | $f + g$ | | $f - g$ | $-f + t_8 g$ | | $f - g$ | | $f - \beta g$ |
| 29 | $t_7 f - g$ | $f - g$ | | $f + \alpha g$ | $f + t_4 g$ | | $f + g$ | | $f - \beta g$ |
| 30 | $t_5 f - g$ | $f - g$ | $f + g$ | $f - \alpha g$ | $f + t_{12}g$ | | $f - g$ | | $f - \lambda g$ |
| 31 | $t_3 f - g$ | $f - g$ | $-f + g$ | $\alpha f - g$ | $t_{12}f - g$ | | $f + g$ | | $f - \lambda g$ |
| 32 | $t_1 f - g$ | $f - g$ | | $\alpha f + g$ | $t_4 f - g$ | | | | $f - g$ |

I claim:

1. A forward transform device for generating a transformed signal from an image signal represented by N digital samples, where N is a multiple of 2, said device comprising, adder bank means for receiving and adding said N digital samples and for generating N/2 top half sums and N/2 bottom half sums, an N/2 forward discrete cosine transform means for forwardly transforming said N/2 top half sums into an N/2 top half transformed output of said transformed signal, an adder bank scaler means for receiving and scaling said N/2 bottom half sums and for providing an N/2 scaled output, an N/2 permutation means for permuting said N/2 scaled output into an N/4 top permuted output and an N/4 bottom permuted output, two N/4 inverse discrete cosine transform means for respectively receiving and for inversely transforming said N/4 top permuted output and said N/4 bottom permuted output, into an N/4 top inverse transformed output and an N/4 bottom inverse transformed output, respectively, an N/4 permutation means for permuting said N/4 bottom inverse transformed output into an N/4 bottom permuted inverse transformed output, and a butterfly bank means for receiving said N/4 top inverse transformed output and said N/4 bottom permuted inverse transformed output and for generating an N/2 bottom half transformed output of said transformed signal.

2. The forward transform device of claim 1 wherein said N/2 top half sums, said N/2 bottom half sums, said N/2 top half transformed output, said N/2 bottom half transformed output, said N/2 scaled output, said N/4 top permuted output, said N/4 bottom permuted output, said N/4 top inverse transformed output, said N/4 bottom inverse transformed output, and said N/4 bottom permuted inverse transformed output each comprise a plurality of digital data elements, said plurality of digital data elements having both positive and negative signs to enable adding, subtracting, scaling, permuting, and multiplying together said plurality of digital data elements within said forward transform device.

3. The forward transform device of claim 1 wherein said adder bank means, said N/2 forward discrete cosine transform means, said two N/4 inverse discrete cosine transform means, and said butterfly bank means each comprise adder-multipliers circuits.

4. The forward transform device of claim 3 wherein said forward transform device are implemented using a RISC computer executing a RISC instruction set comprising fused addition and multiplication instructions, said RISC computer comprising
 a memory means for storing a forward discrete cosine transform program for transforming said image signal into said transformed signal, and
 a processor means for executing said forward discrete cosine transform program.

5. The forward transform device of claim 1 wherein said N/2 permutation means, said two N/4 inverse discrete cosine transform means, said N/4 permutation means and said butterfly bank means provide identity functions for N equal to 4.

6. The forward transform device of claim 1 where said N/4 permutation means provides an identity function for N equal to 8.

7. The forward transform device of claim 1 further comprising a ROM for providing multiplication coefficients for scaling said N/4 top inverse transformed output and said N/4 bottom permuted inverse transformed output into said butterfly bank means, and for scaling said N/2 top half sum into said N/2 forward discrete cosine transform means.

8. The forward transform device of claim 1 wherein said transformed signal is a transmitted transformed signal, wherein said image signal is a received image signal, wherein said forward transform device is also an inverse transform device for generating an output image signal inversely transformed from a received transformed signal also having an N/2 top half transformed output and an N/2 bottom half transformed output, and said output image signal is also represented by N digital samples, said device further comprising,
 a butterfly bank means for receiving said N/2 bottom half transformed output and for providing an N/4 top output and an N/4 bottom output,
 an N/4 permutation means for permuting said N/4 bottom output into an N/4 bottom permuted output,
 two N/4 forward discrete cosine transform means for respectively receiving and for forward transforming said N/4 top output and said bottom N/4 permuted output, into an N/4 top forward transformed output and an N/4 bottom forward transformed output, respectively,
 an N/2 permutation means for permuting said N/4 top forward transformed output and said N/4 bottom forward transformed output and for providing an N/2 permuted output,
 an adder bank scaler means for receiving and scaling said N/2 permuted output and for generating N/2 scaled sums,
 an N/2 inverse discrete cosine transform means for inversely transforming said N/2 top half transformed output into an N/2 top half output, and
 adder bank means for receiving and adding said N/2 top half transformed output and said N/2 scaled sums and for generating said output image signal.

9. The forward transform device of claim 8 wherein said forward transform device are implemented using at least one RISC computer executing a RISC instruction set comprising fused addition and multiplication instructions, said at least one RISC computer comprising
 a memory means for storing a forward and inverse discrete cosine transform program for forward transforming said received image signal into said transmitted transformed signal, and for inversely transforming said received transformed signal into said output image signal, and
 a processor means for executing said forward and inverse discrete cosine transform program.

10. An inverse transform device for generating an image signal from a transformed signal having an N/2 top half transformed output and an N/2 bottom half transformed output, said transformed signal being a discrete cosine transform of said image signal which is represented by N digital samples, where N is a multiple of 2, said device comprising,
 a butterfly bank means for receiving said N/2 bottom half transformed output and for providing an N/4 top output and an N/4 bottom output,
 an N/4 permutation means for permuting said N/4 bottom output into an N/4 bottom permuted output,
 two N/4 forward discrete cosine transform means for respectively receiving and for forward transforming said N/4 top output and said bottom N/4 permuted output, into an N/4 top forward transformed output and an N/4 bottom forward transformed output, respectively,
 an N/2 permutation means for permuting said N/4 top forward transformed output and said N/4 bottom forward transformed output and for providing an N/2 permuted output,
 an adder bank scaler means for receiving and scaling said N/2 permuted output and for generating N/2 scaled sums,
 an N/2 inverse discrete cosine transform means for inversely transforming said N/2 top half transformed output into an N/2 top half output, and
 adder bank means for receiving and adding said N/2 top half transformed output and said N/2 scaled sums and for generating said image signal.

11. The inverse transform device of claim 10 wherein said N/2 top half transformed output, said N/2 bottom half transformed output, said N/4 top output, said N/4 bottom output, said N/4 bottom permuted output, said N/4 top forward transformed output, said N/4 bottom forward transformed output, said N/2 permuted output, said N/2 scaled sums, and said N/2 top half output each comprise a plurality of digital data elements, said plurality of digital data elements having both positive and negative signs to enable adding, subtracting, scaling, permuting, and multiplying together said plurality of digital data elements within said inverse transform device.

12. The inverse transform device of claim 10 wherein said adder bank means, said N/2 inverse discrete cosine transform means, said two N/4 forward discrete cosine transform means, and said butterfly bank means each comprise adder-multipliers circuits.

13. The inverse transform device of claim 12 wherein said forward transform device are implemented using a RISC computer executing a RISC instruction set comprising fused addition and multiplication instructions, said RISC computer comprising
   a memory means for storing an inverse discrete cosine transform program for inversely transforming said transformed signal into said image signal, and
   a processor means for executing said inverse discrete cosine transform program.

14. A method of communicating a transformed signal between two communicating devices comprising a transmitting device and a receiving device, said transformed signal is a discrete cosine transform of an input image signal represented by N digital samples where N is a multiple of 2, said steps comprising,
   adder bank adding for receiving and adding said N digital samples and for generating N/2 top half sums and N/2 bottom half sums,
   N/2 forward discrete cosine transforming for forwardly transforming said N/2 top half sums into an N/2 top half transformed output of said transformed signal,
   adder bank scaling for receiving and scaling said N/2 bottom half sums and for providing an N/2 scaled output,
   N/2 permuting for permuting said N/2 scaled output into an N/4 top permuted output and an N/4 bottom permuted output,
   dual N/4 inverse discrete cosine transforming for respectively receiving and for inversely transforming said N/4 top permuted output and said N/4 bottom permuted output, into an N/4 top inverse transformed output and an N/4 bottom inverse transformed output, respectively,
   N/4 permuting for permuting said N/4 bottom inverse transformed output into an N/4 bottom permuted inverse transformed output, and
   butterfly bank adding for receiving said N/4 top inverse transformed output and said N/4 bottom permuted inverse transformed output and for generating an N/2 bottom half transformed output of said transformed signal,
   transmitting said transformed signal from said transmitting device to said receiving device,
   receiving said transformed signal at said receiving device from said transmitting device,
   butterfly bank adding for receiving said N/2 bottom half transformed output and for providing an N/4 top output and an N/4 bottom output,
   N/4 permuting for permuting said N/4 bottom output into an N/4 bottom permuted output,
   dual N/4 forward discrete cosine transforming for respectively receiving and for forward transforming said N/4 top output and said bottom N/4 permuted output, into an N/4 top forward transformed output and an N/4 bottom forward transformed output, respectively,
   N/2 permuting for permuting said N/4 top forward transformed output and said N/4 bottom forward transformed output and for providing an N/2 permuted output,
   adder bank scaling for receiving and scaling said N/2 permuted output and for generating N/2 scaled sums,
   N/2 inverse discrete cosine transforming for inversely transforming said N/2 top half transformed output into an N/2 top half output, and
   adder bank adding for receiving and adding said N/2 top half transformed output and said N/2 scaled sums and for generating an output image signal which is also represented by N digital samples where N is a multiple of 2.

* * * * *